United States Patent [19]

Miyamoto et al.

[11] Patent Number: 5,136,162
[45] Date of Patent: Aug. 4, 1992

[54] MEASURING DEVICE IN A SCANNING PROBE MICROSCOPE

[75] Inventors: Hirofumi Miyamoto; Tsugiko Takase, both of Hachioji; Hiroshi Kajimura, Tokyo; Akitoshi Toda, Kunitachi, all of Japan

[73] Assignee: Olympus Optical Co., Ltd., Tokyo, Japan

[21] Appl. No.: 730,475

[22] Filed: Jul. 16, 1991

[30] Foreign Application Priority Data

Jul. 26, 1990 [JP] Japan .................. 2-198593

[51] Int. Cl.[5] .................. H01J 37/252; H01J 37/26
[52] U.S. Cl. .................................. 250/306; 250/307
[58] Field of Search ............... 250/306, 307; 73/105

[56] References Cited

U.S. PATENT DOCUMENTS

| | | | |
|---|---|---|---|
| 4,880,975 | 11/1989 | Nishioka et al. | 250/306 |
| 4,912,822 | 4/1990 | Zdeblick et al. | 29/25.35 |
| 4,924,091 | 5/1990 | Hansma et al. | 250/306 |
| 5,066,858 | 11/1991 | Elings et al. | 250/307 |
| 5,083,022 | 1/1992 | Miyamoto et al. | 250/306 |

FOREIGN PATENT DOCUMENTS 2-243906  9/1990  Japan .................. 250/306

OTHER PUBLICATIONS

"Imaging Metal Atoms in Air and Water Using the Atomic Force Microscope", Appl. Phys. Lett. 56 (18); Apr. 30, 1990, pp. 1758-1759.

*Primary Examiner*—Jack I. Berman
*Attorney, Agent, or Firm*—Frishauf, Holtz, Goodman & Woodward

[57] ABSTRACT

A probe for scanning a sample is attached to a probe electrode supported by a cylindrical piezoelectric actuator. The actuator has four drive electrodes on its periphery, and deforms in the three axial directions in accordance with the voltage applied to the drive electrodes. A girdling electrode is provided between the actuator and the probe electrode. The girdling electrode is insulated from the probe electrode and the drive electrodes by insulator members provided on its upper and lower surfaces. A bias voltage signal S1 is input to an operational amplifier of which the output is connected to the girdling electrode. The amplifier is a voltage follower for equalizing the potential of the girdling electrode to that of the bias voltage signal S1. An operational amplifier has a non-inversion input to which the bias voltage signal S1 is input, and an inversion input connected to the probe electrode. While equalizing the potential of the probe electrode to that of the bias input voltage S1, the amplifier converts a tunnel current flowing between the probe and the sample to a voltage signal S2. An operational amplifier subtracts a bias voltage component from the voltage signal S2, and outputs a tunnel current signal S3.

10 Claims, 4 Drawing Sheets

MEASURING DEVICE IN A SCANNING PROBE MICROSCOPE

BACKGROUND OF THE INVENTION

1. Field of the Invention

The present invention relates to a measuring device in a scanning probe microscope.

2. Description of the Related Art

Typical scanning probe microscopes include a scanning tunneling microscope (STM) and an atomic force microscope (AFM).

The STM is a surface configuration measuring device wherein an electrically conductive pointed probe is approached to an electrically conductive sample at a distance of several Å and a tunnel current occurring when a bias voltage is applied across the probe and the sample is utilized. In general, in the STM, the probe/sample distance is servo-controlled so as to keep it constant when the probe scans the surface of the sample. A high-voltage driven piezoelectric element is generally employed to effect scanning and servo control of the probe.

The tunnel current is detected through a probe electrode which is attached to the piezoelectric element with an insulator member interposed. A servo voltage corresponding to the configuration of the sample surface is supplied to the piezoelectric element, so that the probe may scan the sample surface with a constant distance. An insulator member is interposed between a probe electrode and a drive electrode of the piezoelectric element to which the servo voltage is applied, and a capacity is constituted between the drive electrode and the probe electrode. Accordingly, if a servo voltage varying in the course of time is applied to the drive electrode of the piezoelectric element, electric current flows to the probe electrode, as if an AC voltage were applied to an electrode of the capacity. This prevents precise measurement.

In order to solve the above problem, Japanese Patent Application No. 2-134837 (which is based on U.S. patent application Ser. No. 07/589,491, now U.S. Pat. No. 5,083,022) proposes a method of providing a grounded girdling electrode between a probe electrode and a piezoelectric element with an insulating portion interposed, and a method of providing a girdling electrode on a piezoelectric element itself thereby grounding the piezoelectric element.

These methods are advantageous in the case of applying a constant bias voltage to a probe, or applying a modulated bias voltage to a sample, with a probe virtually grounded, thus measuring a local electrical characteristic of the sample on the basis of a tunnel current (the latter is called "Scanning Tunneling Spectroscopy (STS)"). However, if it is necessary to keep the sample at a ground potential or a fixed potential, as in the case of an in-liquid STM, a bias voltage is applied to the probe. In this case, if STS measurement wherein a bias voltage to the probe is modulated is carried out, electric current flows to the probe electrode via an insulator member interposed between the probe electrode and the girdling electrode, since the girdling electrode is grounded. Thus, the electric current is erroneously detected as a tunnel current, and exact STM measurement cannot be carried out.

On the other hand, in the AFM, a cantilever 100 μm to 2000 μm long, which is formed of an elastic material, has a free end portion provided with a pointed probe. The probe is approached to a sample, and an attractive force such as adsorption force or van der Waals force occurs between the atom on the probe tip and the sample surface. On the basis of the displacement of the cantilever resulting from the attractive force, a local configuration and/or characteristic of the sample is measured.

In addition to the above-described attractive force mode, the AFM has a repulsive force mode based on an inter-atomic repulsive force, based on the Pauli principle, acting between one atom of the probe tip and one atom of the sample. In the former mode, the force of $10^{-7}$ to $10^{-12}$N is detected on the basis of the displacement of the cantilever; in the latter mode, the force of $10^{-7}$ or more is detected similarly.

In the repulsive force mode, what is to be measured by the AFM is mainly an inter-atomic force acting between only the closest atoms of the probe tip and the sample. In other words, although an attractive force acts between the atoms other than the closest atoms, the attractive force is much weaker than the repulsive force and is negligible.

On the other hand, in the attractive force mode, there occurs a force which influences the displacement of the cantilever and is other than inter-atomic force. One example is a meniscus force occurring when water molecules gather between the probe and sample.

S. Manne and P. K. Hamsma et al of the California University, Barkley proposed, as described in "Imaging metal atoms in air and water using the atomic force microscope" Appl. Phys. Lett. 56(18), Apr. 30, 1990, an effective method of putting a probe and a cantilever in water and carrying out measurement while meniscus force is prevented from affecting the probe and cantilever, generally, when a non-polarized liquid such as water is employed.

However, in an environment in which the probe and cantilever are surrounded by a polarizable insulating material, the inside and outside of the AFM apparatus are influenced by electrostatic force of a charge which occurs on the surface of the probe and cantilever since the insulating material is polarized by the presence of objects having abnormal potential energy. This prevents exact measurement.

SUMMARY OF THE INVENTION

An object of the present invention is to carry out exact STS (Scanning Tunneling Spectroscopy) measurement, in which a modulated bias voltage is applied to a probe electrode, by eliminating an AC component of electric current flowing between the probe electrode and a girdling electrode, thereby enhancing an S/N of a tunnel current.

Another object of the invention is to carry out exact measurement, without influence by an external potential.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A first embodiment of the present invention will now be described with reference to the accompanying drawings.

Figure 1:
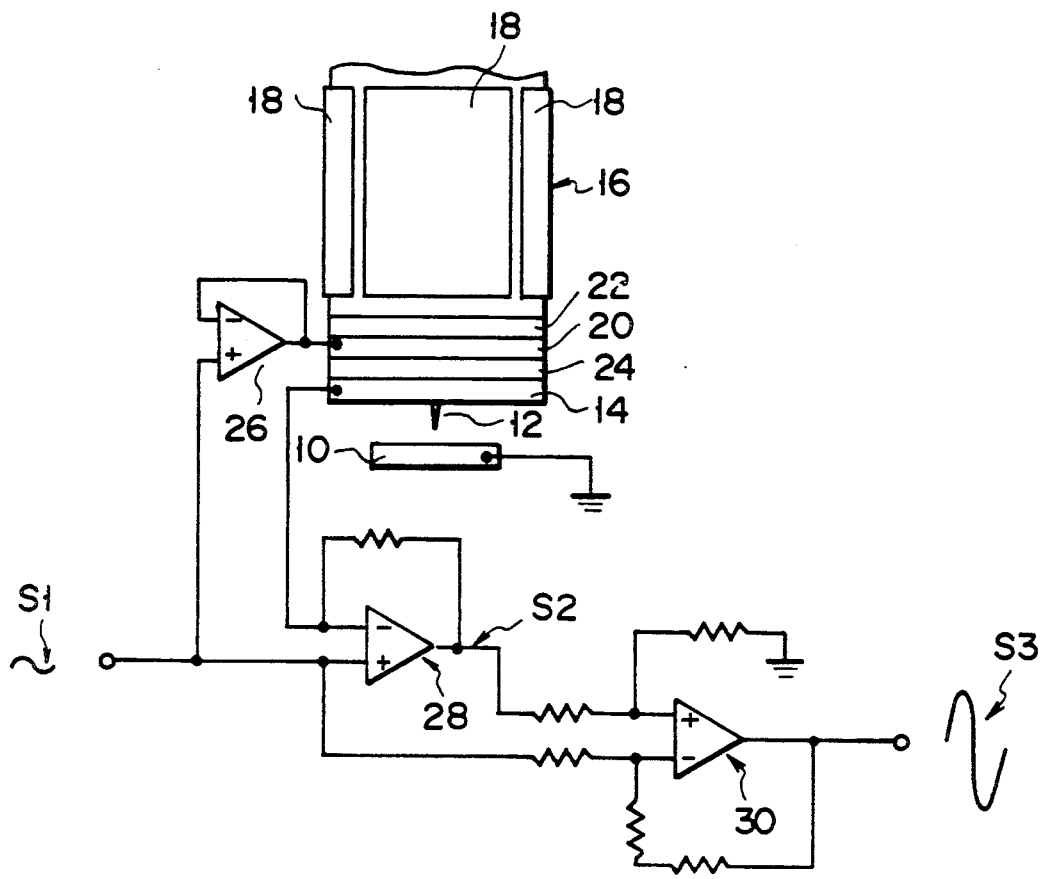
FIG. 1 shows the structure of a measuring device according to a first embodiment of the present invention.

As is shown in FIG. 1, a probe 12 for scanning a sample 10 is attached to a probe electrode 14. The probe electrode 14 is supported by a cylindrical piezoelectric actuator 16. Four drive electrodes 18 are provided on the peripheral wall of the actuator 16. The actuator 16 is deformable in the directions of three axes in accordance with the combination of voltages applied to the drive electrodes 18. Thereby, the probe 12 is moved along the three axes. A girdling electrode 20 is provided between the actuator 16 and the probe electrode 14. The girdling electrode 20 is insulated by insulators 22 and 24, which are provided on the upper and lower surfaces of the girdling electrode 20, from the probe electrode 14 and the drive electrodes 18 of piezoelectric actuator 16.

A bias voltage signal S1 is input to an operational amplifier 26. The output of the amplifier 26 is connected to the girdling electrode 20. The operational amplifier 26 serves as a voltage follower for keeping the potential of the girdling electrode at the same value as that of the bias voltage signal S1. The bias voltage signal S1 is also input to a non-inversion input of an operational amplifier 28. An inversion input of the amplifier 28 is connected to the probe electrode 14. While the potential of the probe electrode 14 is equalized to that of the bias input voltage, a tunnel current flowing between the probe 12 and the sample 10 is converted to a voltage signal. An operational amplifier 30 is a differential amplifier for subtracting a bias voltage component from a bias added tunnel current signal S2 output from the operational amplifier 28, and voltage-amplifying the subtracted result. Thus, the amplifier 30 outputs a tunnel current signal S3.

In the STS measurement, if the bias voltage signal S1 having an AC component is supplied, the potentials of the probe 12 and girdling electrode 14 vary while they are kept equal to the potential of the bias voltage signal S1. Thus, it is possible to prevent a leak current from flowing between the probe electrode 14 and the girdling electrode 20 via a capacitance of the insulator 24, and only a tunnel current flowing between the probe 12 and the sample 10 can be detected.

In the STM measurement, when a voltage for scanning is applied to the drive electrode 18, an electric current from the drive electrode flows into the girdling electrode 20 via capacitance components of insulators 22 and 24 and does not flow into the probe electrode 14. Thus, only a tunnel current flowing between the probe 12 and the sample 10 can be detected.

Accordingly, irrespective of the STS measurement mode and the STM measurement scan mode, the probe electrode 14 can detect only the tunnel current flowing between the probe 12 and sample 10, thus enabling exact high-precision STS measurement and STM measurement to be carried out. When the STS measurement is not performed, the bias voltage signal S1 is kept at a constant potential, and, like in the STM measurement mode, the current leakage from the drive electrode 18 can be prevented. In other words, the current leakage can be prevented by the girdling electrode.

Figure 2:
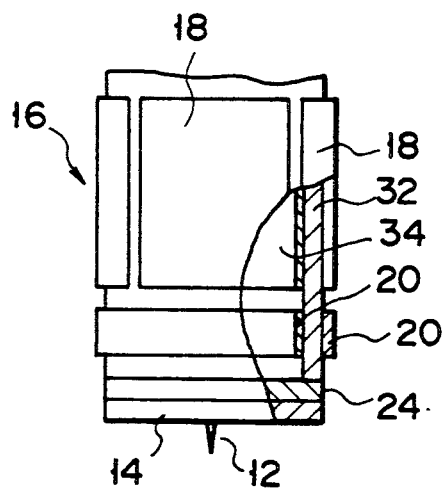
FIG. 2 shows a second embodiment of the invention.

Referring now to FIG. 2, a second embodiment of the present invention will now be described. In FIG. 2, the structural elements already employed in the first embodiment are denoted by like reference numerals, and detailed descriptions thereof are omitted.

A probe electrode 14 to which a probe 12 is attached is provided on a cylindrical piezoelectric actuator 16 with an insulator 24 interposed therebetween. The actuator 16 has a cylindrical piezoelectric element 32. Four drive electrodes 18 are provided on the outer wall of the piezoelectric element 32. A common electrode 34 is provided on the inner wall of the piezoelectric element 32 so as to face the drive electrodes 18. The probe 12 is moved in the three-dimensional directions by the extension and contraction of that part of the piezoelectric element 32 which is interposed between the electrodes 18 and 34. Further, the piezoelectric element 32 is provided with a pair of girdling electrodes 20 which are formed in a strip-like shape so as to face the inner and outer walls of the piezoelectric element 32.

In this embodiment, like the first embodiment, the circuit shown in FIG. 1 is employed. The girdling electrode 20 is connected to the output of the operational amplifier 26, and the probe electrode 14 is connected to the inversion input of the operational amplifier 28. The operation and effect of the circuit have already been described in connection with the first embodiment.

Figure 3:
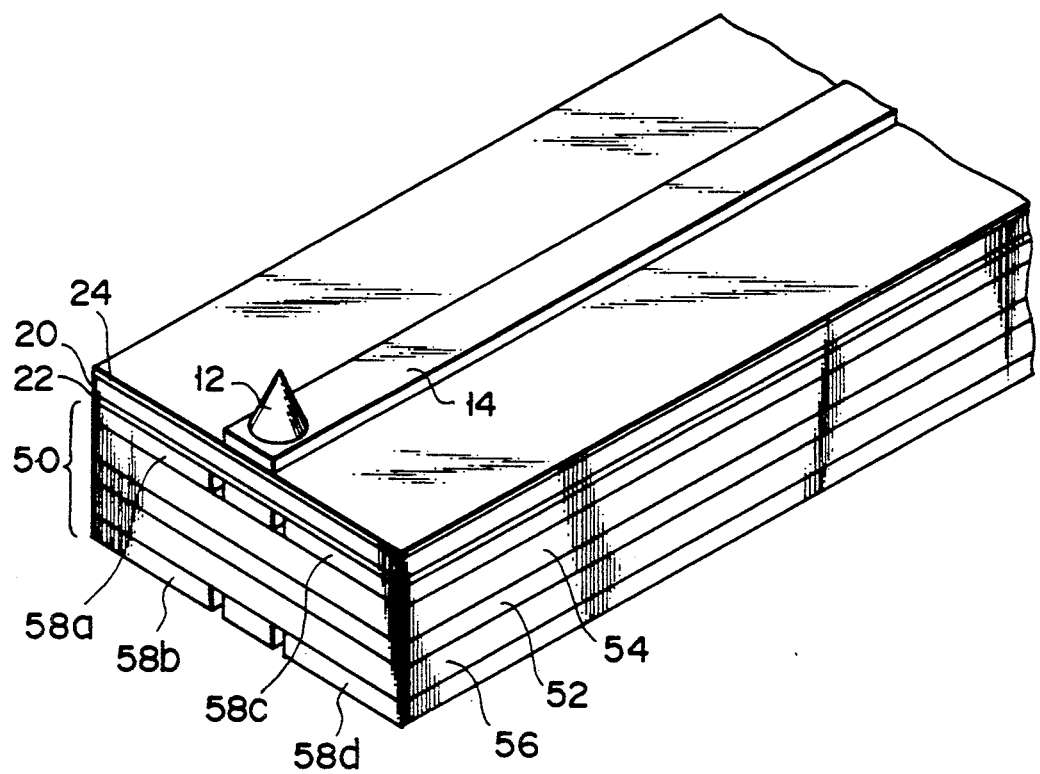
FIG. 3 shows a third embodiment of the invention.

FIG. 3 shows a third embodiment of the invention. In the third embodiment, a cantilever 50 is employed as a scanning element of the probe, in place of the cylindrical piezoelectric actuator employed in the above embodiments. The cantilever 50 includes two pairs of bimorphs developed by Albrecht and C. F. Quate of the Stanford University. The cantilever 50 has a common electrode 52 at its center part. The common electrode 52 is sandwiched by ZnO thin films 54 and 56. Two drive electrodes 58a and 58c are provided on the upper surface of the ZnO thin film 54, and two drive electrodes 58b and 58d are provided on the lower surface of the ZnO thin film 56. By controlling voltages applied to the four drive electrodes 58a to 58d, the tip portion of the cantilever 50 can be moved in three-dimensional directions. The principle of the operation is disclosed in U.S. Pat. No. 4,912,822. In this embodiment, an insulating film 22 is formed on the drive electrodes 58a and 58c of the cantilever 50, and a girdling electrode 20 is laminated on the insulating film 22. An insulating film 24 is formed on the girdling electrode 20. A probe electrode 14 is provided on the center area of the insulating film 24 so as to extend in the longitudinal direction. A probe 12 is mounted on the probe electrode 14.

In this embodiment, too, the circuit shown in FIG. 1 is employed. The girdling electrode 20 is connected to the output of the operational amplifier 26, and the probe electrode 14 is connected to the inversion input of the operational amplifier 28. The operation and effect of the circuit have already been described in connection with the first embodiment.

Figure 4:
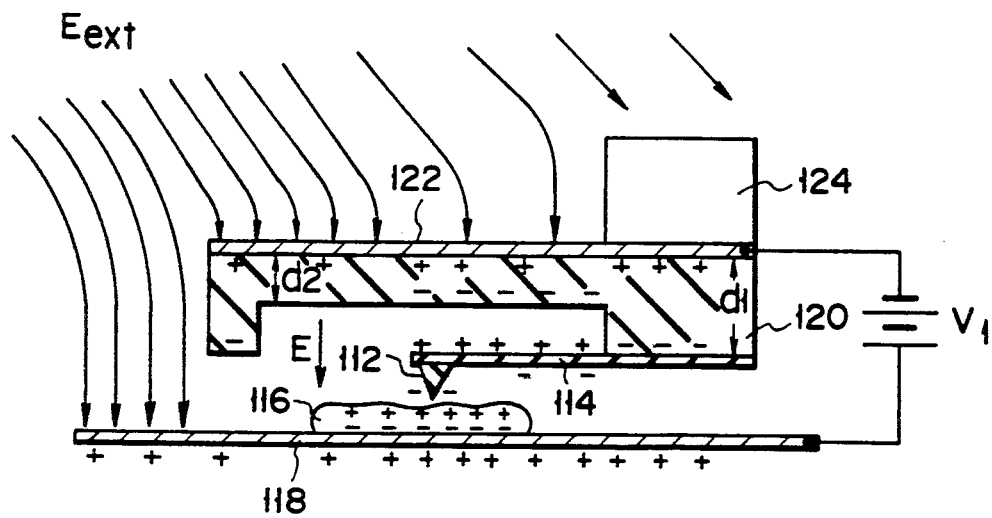
FIG. 4 is a cross-sectional side view of a measuring device according to a fourth embodiment of the invention.
Figure 5:
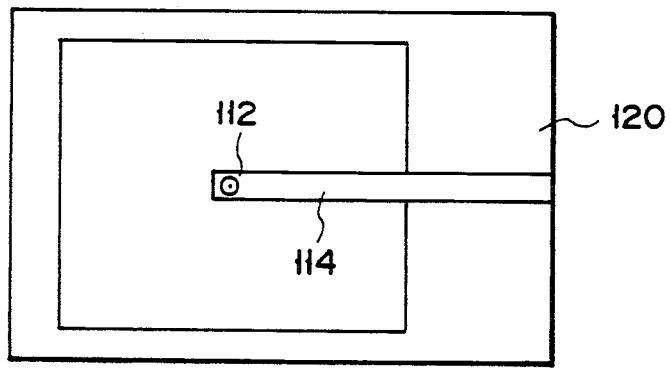
FIG. 5 is a bottom view of the measuring device shown in FIG. 4

FIG. 4 is a cross-sectional view showing a fourth embodiment of the invention, and FIG. 5 is a bottom view of the fourth embodiment. A probe 112 is provided at a free end portion of a cantilever 114. The probe 112 is supported in a position where the probe 112 is approached to a sample 116 at such a distance that an inter-atomic force acts between the probe 112 and the sample 116. The cantilever 114 is fixed to a Pyrex glass substrate 120 by means of anode bonding. The substrate 120 has portions with thicknesses d1 and d2 (d1<d2). An electrode 122, which is formed by depositing Au on Cr, is formed on the upper surface of the substrate 120. The cantilever 114 adjusts the distance between the probe and the sample. The cantilever 114 is supported on the piezoelectric element 124 for scanning the probe 112. Means for detecting the displacement of the free end portion of the cantilever 114 due to interatomic force and attraction force is not shown. The sample 116 is firmly attached on an electrically conductive sample substrate 118 of Au, etc. by means of chemical adsorption. The electrode 122 and the sample substrate 118 are connected to a power source V1 for applying a predetermined voltage.

In this embodiment, a predetermined voltage is applied between the electrode 122 and the sample substrate 118, and an electric field E is generated therebetween. On the other hand, as shown in FIG. 4, some of lines of electric force in an electric field $E_{ext}$ generated by an external potential object travel vertically onto the upper surface of the electrode 122. The other lines of electric force travel onto the sample substrate 118 or to the space outside the electrode 122. No lines of electric force do not enter the space between the electrode 122 and the sample substrate 118. Since the electrode 122 does not shield the electric field $E_{ext}$ of the external potential, the probe 112 is not influenced by the electric field $E_{ext}$.

The Pyrex glass substrate is polarized by the electric field E, and a positive charge and a negative charge are distributed on the upper and lower surfaces of the substrate in accordance with the dielectric constant $\epsilon$ and thicknesses d1 and d2 of the substrate. If the cantilever 114 and the probe 112 are formed of an insulator such as $Si_3N_4$ or $SiO_2$, the cantilever 114 and probe 112 are also polarized and charges are distributed on the surfaces thereof. Further, if the sample 116 is a polarizable substance, the sample 116 is also polarized. The electric fields generated by the charge distributions are influenced by the dielectric constant. If the potential V applied to the electrode 122 and the sample substrate 118 is set to a predetermined value, the electrostatic force acting on the charge (high at the tip) of the probe 112 is determined by this predetermined value and can be controlled. At this time, the charge of the probe 112 and the polarized local charge of the sample 116 affect each other, and an attractive force occurs. Thus, the cantilever 114 is displaced.

Specifically, since an electric field controlled to a predetermined value only by power source V1 is generated in the vicinity of the probe 112, measurement is possible without influence due to the electric field $E_{ext}$ of the external potential object.

Figure 6:
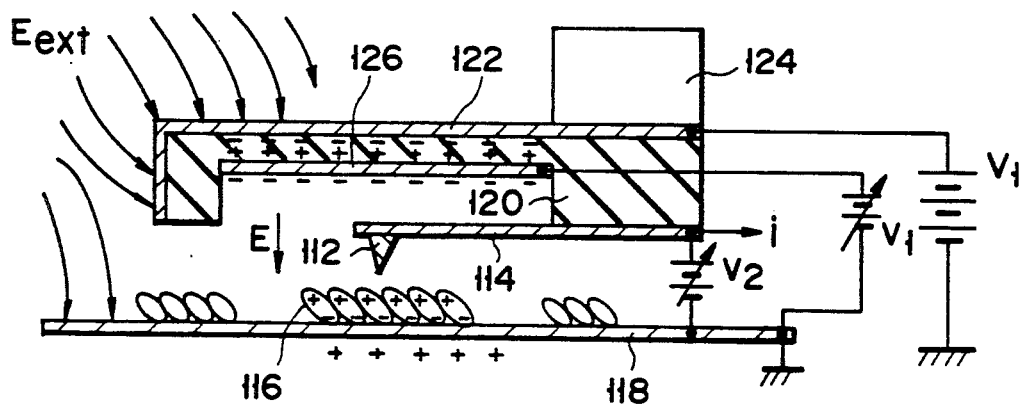
FIG. 6 shows a fifth embodiment of the invention.

FIG. 6 shows a fifth embodiment of the present invention. The structural elements already mentioned in the preceding embodiments are denoted by like reference numerals, and detailed descriptions thereof are omitted.

In the fifth embodiment, an electrode 122 or an upper electrode is provided on both the upper and side faces of a Pyrex glass substrate 120. An electrode 126 or a lower electrode is provided on the lower surface of a thin portion (the portion with thickness d2) of the Pyrex glass substrate 120. The electrode 126 is electrically connected to a sample substrate 118 via a variable power source v1. The probe 112 and cantilever 114 are formed by doping phosphorus in silicon at high concentration, so that they have electrical conductivity. The probe 112 and cantilever 114 are electrically connected to the sample substrate 118 via a variable power source v2. The variable power source v2 applies a voltage to the sample 116 and the probe 112. Thus, an AFM capable of detecting a tunnel current i can be constructed.

Figure 7A:
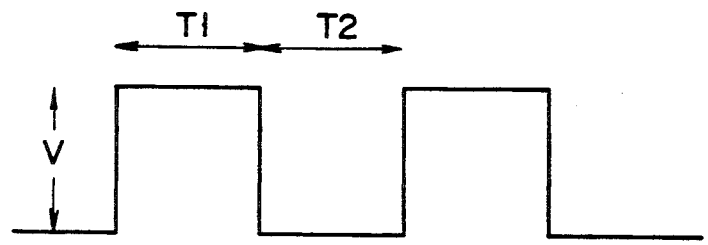
FIGS. 7A and 7B are timing charts showing the relationship between a pulse voltage applied to a lower electrode shown in FIG. 6 and an output of an AFM or an output of tunnel current.
Figure 7B:
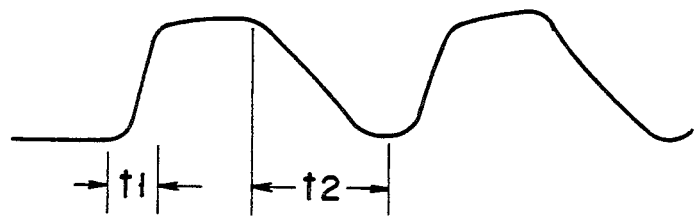

A predetermined constant voltage is applied from the power source v2 to the electrode 122. Thus, like in the above embodiments, electric field $E_{ext}$ of external disturbance is shielded, and the influence to the probe 122 is eliminated. A predetermined variable voltage is applied to the electrode 126. Suppose that the variable voltage to be applied is a pulse voltage with an amplitude v, pulse duration T1 and pulse interval T2, as shown in FIG. 7A, and the output of the AFM or tunnel current i has a waveform synchronous with the pulse voltage of FIG. 7A, as shown in FIG. 7B. In this case, it is possible to obtain relaxation times t1 and t2 of local molecular orientation characteristics and polarization characteristics of the sample 116 with respect to the input of electric field.

Since the Pyrex glass substrate 120, electrode 122 and electrode 126 can easily be made transparent, it is possible to measure at the same time the polarization characteristic of the sample 166 by interposing the present apparatus between a polarizer and an analyzer.

Figure 8:
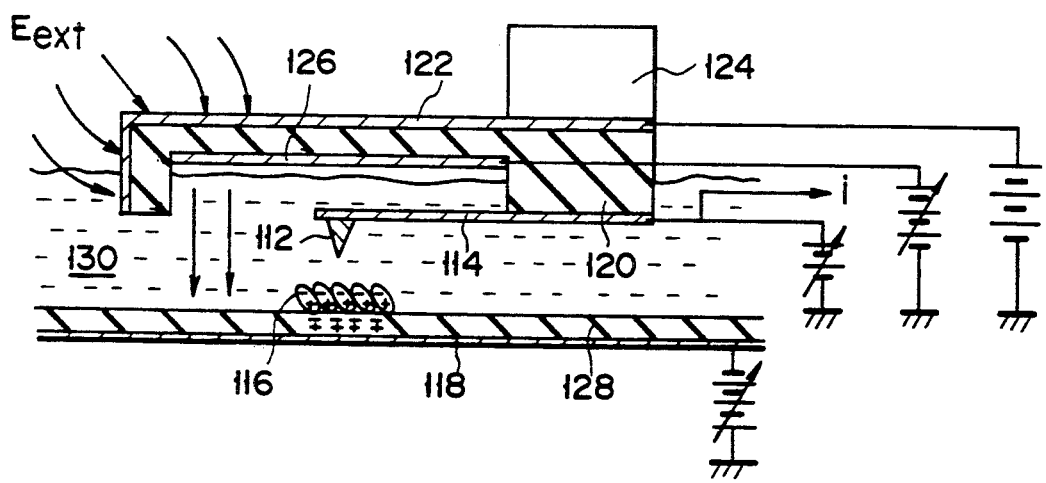
FIG. 8 shows a sixth embodiment of the invention.

FIG. 8 shows a sixth embodiment of the present invention. In this embodiment, a polarizable insulating thin film 128 is laminated on a sample substrate 118. Predetermined voltages are applied to the electrode 122 and the sample substrate 118, thereby shielding an electric field $E_{ext}$ of an external potential and polarizing a Pyrex glass substrate 120 and the insulating thin film 128. By the polarization of the insulating thin film 128, a molecular film of the sample 116 is fixed by chemical adsorption. If the sample 116 is colloidal molecules and float in a solution 130, the production and subsequent state of the molecular film can be measured while controlling the orientation of the molecular film.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A measuring device in a scanning probe microscope, comprising:
   an electrically conductive probe;
   a probe electrode, connected to said probe, for taking out a tunnel current;
   scanning means having drive electrodes and controlled electrically to scan the probe;
   a girdling electrode provided between said drive electrodes of the scanning means and the probe electrode and electrically insulated from these electrodes; and
   voltage application means for applying a voltage, which is equal to the voltage applied to the probe, to the girdling electrode.

2. The device according to claim 1, wherein said scanning means compress a cylindrical piezoelectric actuator including a cylindrical piezoelectric element, a common electrode provided within said piezoelectric element, and four drive electrodes provided around said piezoelectric element.

3. The device according to claim 1, wherein said scanning means comprises a cantilever including two plate-like piezoelectric elements, a plate-like common electrode interposed between the two piezoelectric elements, and two strip-like drive electrodes provided on each piezoelectric element.

4. A measuring device in a scanning probe microscope, comprising:
   a probe with a pointed tip;
   a lever member having said probe at its free end portion, and being elastically deformable upon receiving a force acting between the tip of the probe and the surface of a sample;
   support means for fixing and supporting the other end portion of the lever member;
   an electrode formed integral with the support means and situated so as to face the lever member;
   an electrically conductive support substrate for supporting the sample; an
   a power source for applying a voltage between said electrode and said electrically conductive support substrate.

5. The device according to claim 4, wherein a polarizing member is provided on that side of the electrode, which faces the sample, so as to face the lever member, and wherein said power source comprises a controllable power source capable of displacing the lever member by exerting a coulomb force between the charge generated on the surface of the polarizing member by the applied voltage, and the charge generated on the lever member or the probe.

6. The device according to claim 4, wherein said electrode comprises two or more independent electrodes, each having an independently controllable power source.

7. The device according to claim 4, wherein said probe and the sample have electrical conductivity, and the power source comprises a control power source controlled to polarize the sample.

8. The device according to claim 7, wherein said control power source generates a rectangular pulse voltage.

9. The device according to claim 4, wherein said power source is controlled to control an electric field between the electrode and the electrically conductive support substrate and to polarize the sample.

10. The device according to claim 4, wherein said electrically conductive substrate is formed to support the sample with a polarizable film interposed therebetween.

* * * * *